Figure 1:
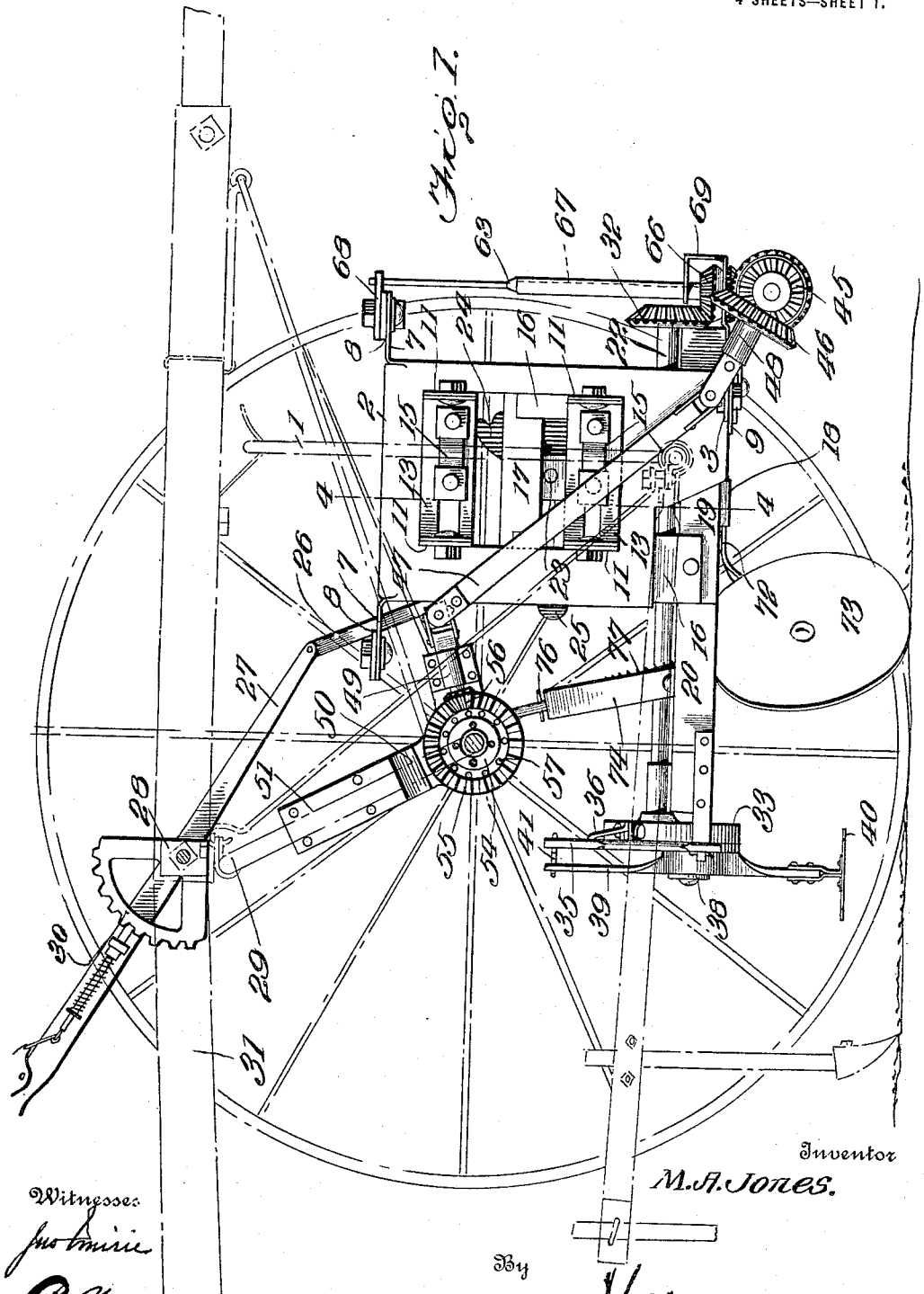

M. A. JONES.
COTTON CHOPPER.
APPLICATION FILED JULY 13, 1914.

1,163,240.

Patented Dec. 7, 1915.
4 SHEETS—SHEET 1.

Witnesses

Inventor
M. A. Jones.
By
Attorneys.

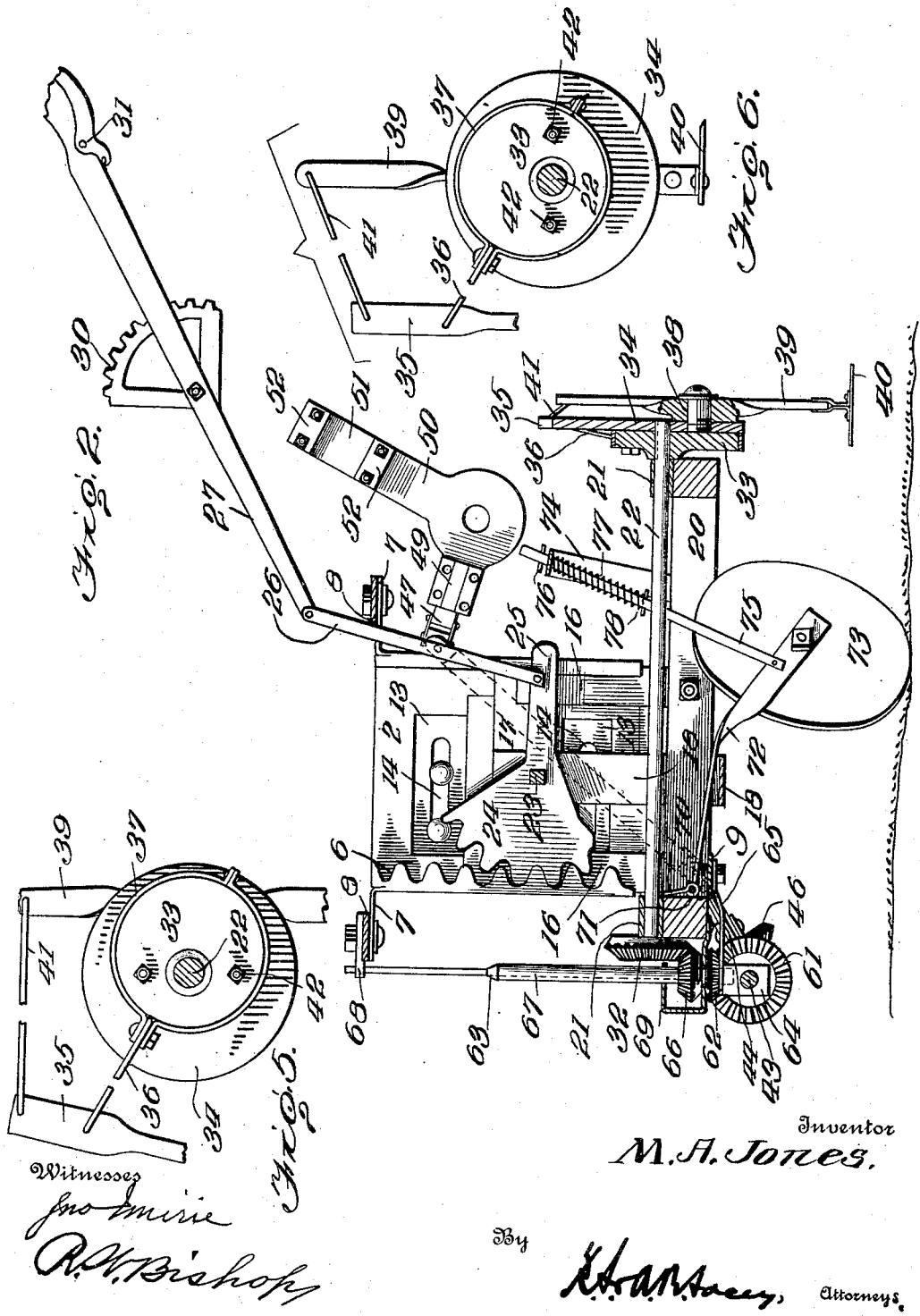

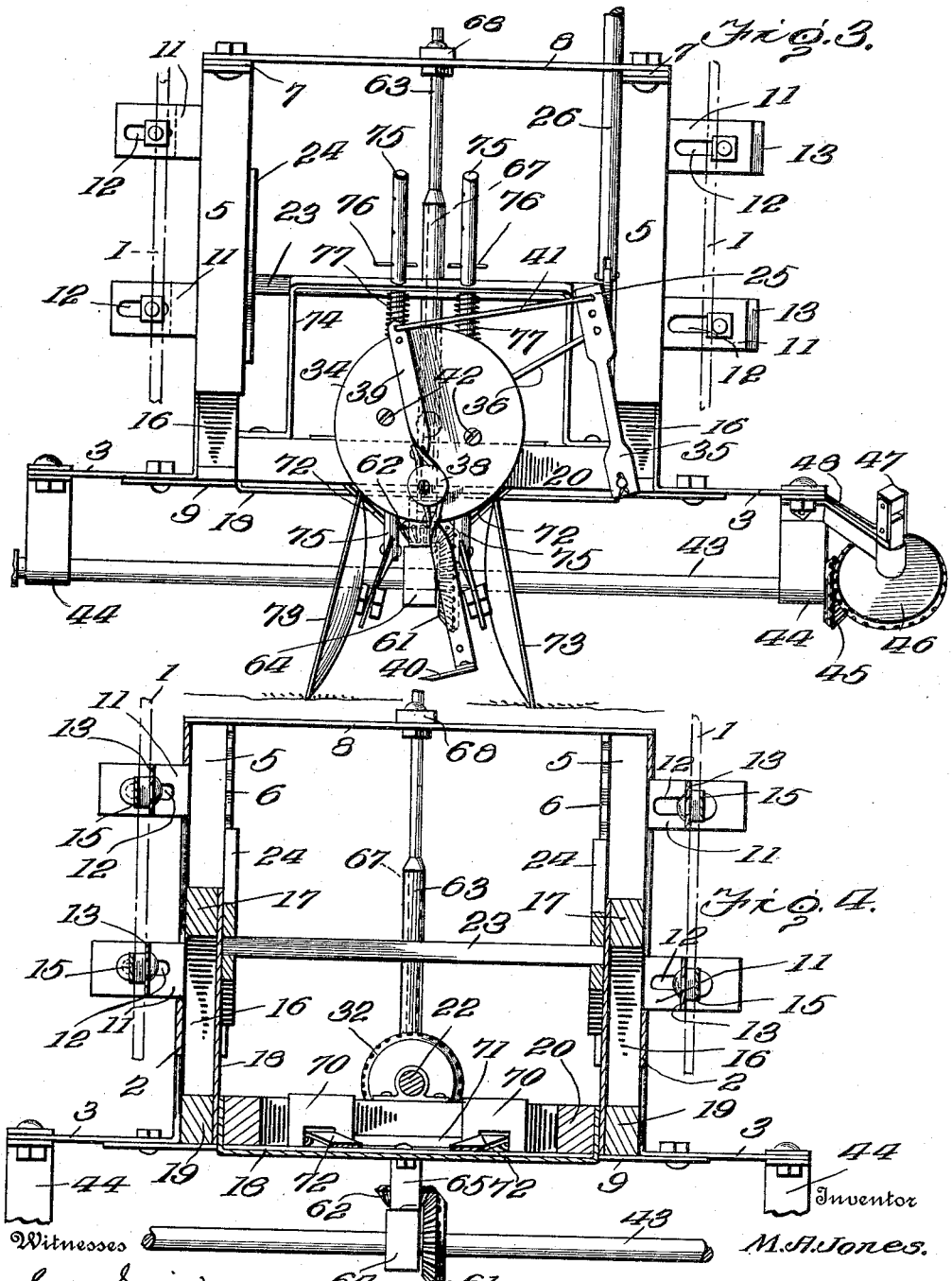

M. A. JONES.
COTTON CHOPPER.
APPLICATION FILED JULY 13, 1914.
1,163,240.
Patented Dec. 7, 1915.
4 SHEETS—SHEET 4.
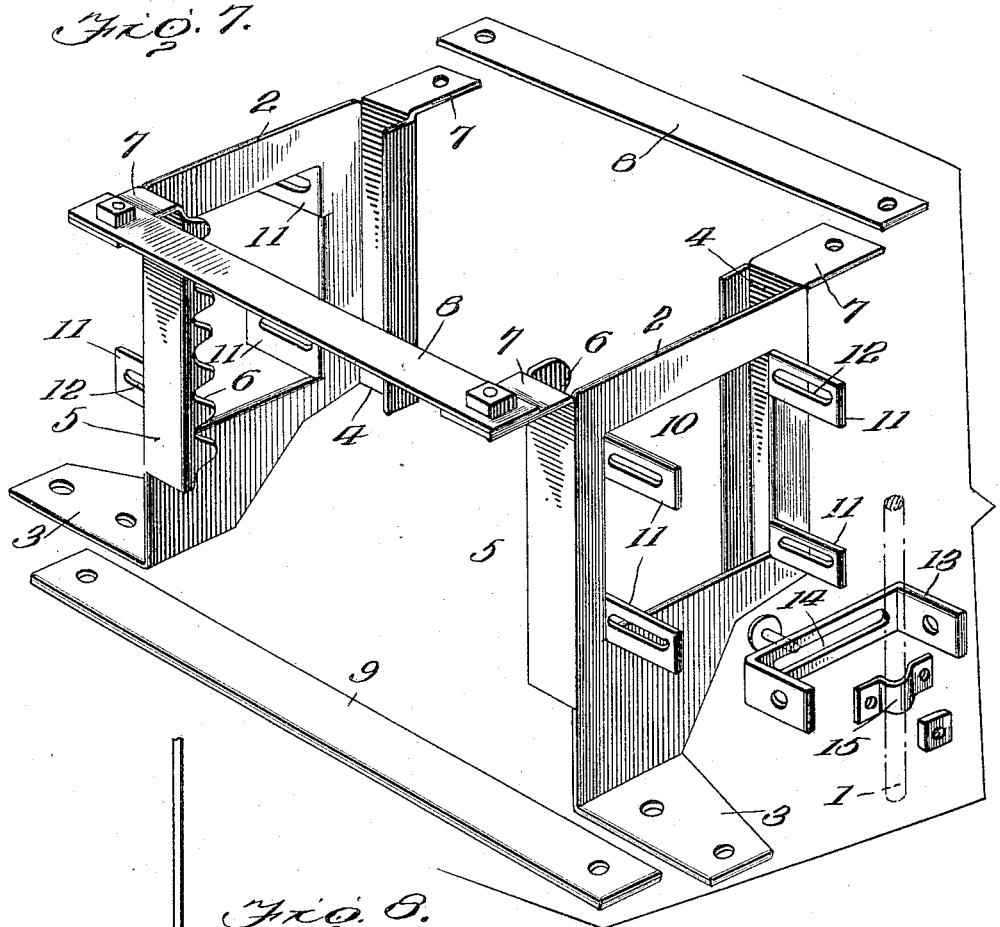
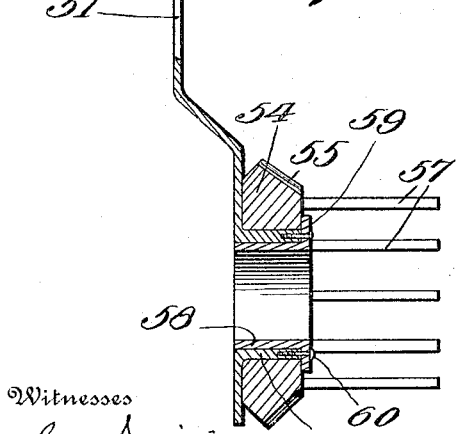
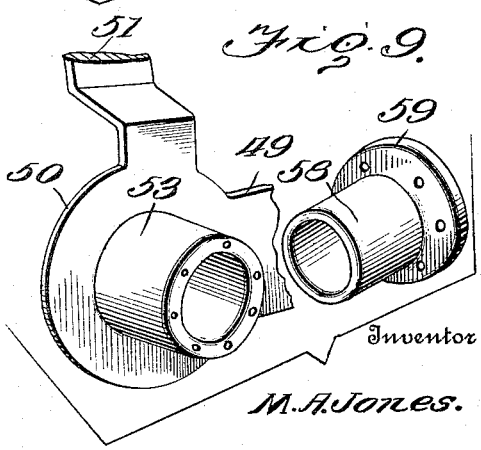
Witnesses
Inventor
M. A. Jones.
By
Attorneys

UNITED STATES PATENT OFFICE.

MARTIN A. JONES, OF McGREGOR, TEXAS.

COTTON-CHOPPER.

1,163,240.   Specification of Letters Patent.   Patented Dec. 7, 1915.

Application filed July 13, 1914. Serial No. 850,770.

*To all whom it may concern:*

Be it known that I, MARTIN A. JONES, citizen of the United States, residing at McGregor, in the county of McLennan and State of Texas, have invented certain new and useful Improvements in Cotton-Choppers, of which the following is a specification.

This invention relates to cotton choppers and the primary object of the invention is to provide a cotton chopper which may be mounted upon any cultivator frame and which will operate easily and efficiently to thin out standing cotton or other plants which are growing in rows.

A further object of the invention is to provide novel means for raising and lowering the chopper so that it may operate at the desired depth or may be lifted entirely clear of the ground to be moved from point to point while inoperative.

A further object of the invention is to provide novel means for operating the chopper blade whereby it will perform its work in a highly efficient manner.

The invention, also, seeks to improve generally the construction and arrangement of the parts of a cotton chopper to the end that the efficiency and durability of the same may be increased while the cost of production and operation will be kept upon an economical basis.

The several stated objects of my invention and such other incidental objects as will appear from the following description, are attained in mechanism of the character illustrated in the accompanying drawings and the invention resides in certain novel features which will be particularly pointed out in the claims following the detailed description.

In the drawings, Figure 1 is an elevation of a cotton chopper embodying my present improvements and illustrating the position of the same relative to a cultivator. Fig. 2 is a central longitudinal vertical section of the improved cotton chopper. Fig. 3 is a rear end elevation of the same. Fig. 4 is a transverse section taken on the line 4—4 of Fig. 1. Figs. 5 and 6 are detail views showing different adjustments of the chopper blade with the immediately adjacent parts for operating the same. Fig. 7 is an enlarged perspective view of the main supporting frame showing the parts thereof detached but in their proper relative positions. Fig. 8 is a detail section through the main driving gear wheel and its support. Fig. 9 is a detail perspective view of parts of the same.

In carrying out my invention, I employ a main frame which is intended to be placed between the side portions of the front arch of a cultivator indicated at 1. This frame consists of side members or standards 2 having laterally projecting lugs 3 at their lower front corners and having vertical guide ways 4 provided on their inner sides at their front and rear edges. These guide ways are preferably formed by providing integral flanges as shown at 5, which flanges have their inner edges projected toward each other parallel to the side members 2 upon which they are formed. The inner edges 6 of the front flanges 5 are in the form of rack bars, as clearly shown, and at the upper ends of all said flanges 5 are lugs or brackets 7 which project respectively forwardly and rearwardly, as clearly shown in Fig. 7. Cross bars 8 are secured to and extend between the said brackets or lugs so as to form rigid connections between the side members 2 whereby the said members will be properly braced and held in the desired spaced relation. A similar connecting bar 9 is secured to the undersides of the brackets or projections 3 at the lower front corners of the side members, as shown and as will be readily understood. The side members 2 are cut away centrally to reduce weight and from the front and rear edges of the opening 10 thus formed are extended side brackets or lugs 11 adjacent the upper and lower walls of the said openings, and these several brackets are constructed with longitudinal slots 12 for a purpose which will presently appear. U-shaped brackets 13 are fitted between the upper lugs or brackets 11 and similar brackets are, also, fitted between the lower brackets or lugs 11 at each side of the frame. These U-shaped brackets 13 are secured to the brackets or lugs 11 by means of bolts inserted through the side members of the U-shaped brackets and through the slots 12 of the laterally projecting lugs or brackets 11. This arrangement permits the said U-shaped brackets to be adjusted laterally to or from the side members 2 of the main frame so that the device may be fitted to an arch 1 of any width. The main frame is inserted between the side members of the arch 1 as previously stated and the U-shaped brackets 13 are adjusted so that the main body or connecting portion of the said brackets will lie against the inner surfaces of the said side members of the arch. The main body or connecting portion of each bracket 13 is provided with a longitudinal slot 14 and a clip 15 is fitted over the side of the arch and against the said connecting portion and secured in place by means of bolts inserted through the slots 14 and the ends of the clips as will be readily understood. The clips may thus be adjusted forwardly or rearwardly upon the brackets 13 so as to properly position the main frame within the arch and thus adapt the cotton chopper to be secured to any cultivator frame.

Mounted within the main frame is a vertically movable frame which consists of front and rear standards 16 fitted within the guide-ways 4 on the main frame so as to slide vertically therein. The upper ends of these standards are connected by beams 17 and to the said beams, at about the centers thereof, I secure the upper ends of the sides of a U-shaped bar 18 which extends transversely of the machine so as to connect the two side portions of the vertically movable frame. The lower ends of the standards 16 at each side of the machine are connected by beams 19 and secured to the said lower beams 19 is a horizontal frame 20 which extends rearwardly from the said sliding frame and is equipped at its front and rear ends with bearings 21 for the chopper shaft 22. Journaled in and extending within the side members of the U-shaped connection 18 is a rock shaft 23 having rigidly secured thereto at its ends the segmental gears 24 which mesh with the respectively adjacent racks 6, as shown most clearly in Fig. 5. One of these segmental gears has an arm 25 rigid therewith and extending rearward beyond the rock shaft, and a link 26 connects the said arm 25 with an operating lever 27 which is fulcrumed on a bracket 28 secured in any desired or convenient manner to the rear arch 29 of the cultivator frame. A holding segment 30 is provided concentric with the fulcrum of this lever and a latch 31 of the usual form is mounted upon the lever and is adapted to engage the said segment so as to hold the lever in a set position. It will be readily understood that by rocking the lever about its pivot the arm 25 will be oscillated and the gears 24 caused to ride upon the racks 6 and thereby raise or lower the vertically movable frame, the intermeshing teeth of the segmental gears and the racks constituting fulcrums about which the rock shaft 23 will be caused to move vertically and the frame in which said rock shaft is mounted will, of course, follow the movements of the same.

The chopper shaft 22 is provided at its front end with a bevel pinion 32 which is actuated through driving mechanism to be presently described and upon the rear end of said shaft is secured an eccentric 33 and a crank disk 34. An oscillatory arm or lever 35 is pivoted at its lower end to the rear end of the frame 20 and to the said oscillatory arm near the upper end thereof, I pivotally attach one end of the eccentric rod 36 which is secured to the strap 37 passing around the eccentric 33. As the shaft 22 is rotated the eccentric 33 will, of course, be carried around the same and will impart a reciprocating movement to the rod 36 which in turn will oscillate the arm or lever 35. Fulcrumed upon the crank disk 34 eccentrically of the same, as shown at 38, is a shank, standard or stem 39 having a chopper blade or hoe 40 at its lower end and having its upper end connected by a link or connecting rod 41 with the upper end of the oscillatory armor lever 35, as clearly shown. As the chopper shaft is rotated the crank disk 34 will, also, be rotated and will carry the fulcrum 38 over a path concentric with the shaft. Inasmuch, however, as the lever or arm 35 is being simultaneously oscillated through the eccentric 33 and connecting rod 36, oscillatory movement will be imparted to the stem 39 through the said arm and the link 41 so that the hoe or chopper blade 40 will be carried through the ground in a substantially horizontal plane and then quickly lifted and brought back to its starting point where it will be caused to assume an inclination relative to the surface of the ground so that when it is again swung across the row of plants it will quickly and easily enter the ground and cut through the stems of the plants to be removed. With the eccentric and crank disk adjusted as shown in Fig. 5, the chopper blade will move in the same direction as the oscillatory arm or lever 35 but with the eccentric and crank disk in the relative positions shown in Fig. 6, the chopper will move in the opposite direction to the oscillatory lever and will thus be given a sharper and faster movement through the ground. This capability of adjustment will sometimes be found advantageous owing to the nature of the soil in which the device is to work. It will be understood that the eccentric is secured to the crank disk by the bolts 42 and is loose upon the chopper shaft while the crank disk is keyed or otherwise rigidly secured to the shaft.

The main shaft 43 of the driving mechanism is mounted in brackets 44 which are secured to and project forwardly from the brackets or extensions 3 of the side members 1 as shown most clearly in Figs. 3 and 4. This shaft 43 extends across the front of the machine and is equipped at one end with a bevel gear 45 meshing with a gear 46 on the lower end of a telescopic shaft 47 which is mounted at its lower end within a bearing 48 carried by the adjacent bracket 44 and at its upper end the said telescopic shaft is mounted in a bearing 49 formed upon a bracket 50 which is adapted to be secured to the side of the rear arch 29 of the cultivator frame. To permit this bracket to be secured to the arch it is formed with an elongated arm 51 adapted to fit against the side of the said arch 29 and to the said arm 51 I secure clips 52 which bear against the side of the arch and thereby firmly clamp the bracket to the same. At the junction of the arm 51 and the bearing 49 the bracket is constructed with a hub or sleeve 53 which projects outwardly toward the adjacent ground wheel of the cultivator. A master gear 54 is fitted upon the said hub and this master gear is provided with bevel cog teeth 55 adapted to engage a pinion 56 at the upper rear end of the telescopic shaft 47 and is, also, provided with an annular series of pins or projections 57 which are adapted to fit between the spokes of the ground wheel so that motion will be imparted to the master gear by the said wheel when the cultivator is drawn over the ground. To retain the master gear upon the hub 53 a sleeve 58 is inserted in the hub from the outer side thereof and this sleeve is provided with an annular radial flange 59 which bears against the outer face of the master gear as shown clearly in Fig. 8 so that the gear will be retained on the hub 53 between the said flange and the main portion of the bracket 50. Screws or similar fastening devices 60 are inserted through the flange 59 into the hub 53 as shown in Fig. 8, so as to retain the parts in operative relation. At about its center the shaft 43 carries a bevel gear 61 which meshes with a bevel pinion 62 fixed on the lower end of a vertical shaft 63 which shaft has its lower end stepped in a block or other support 64 which is fitted loosely upon the shaft 43 and is held in proper position by a bracket 65 secured to and projecting forwardly from the bar 9 of the main frame. It will thus be readily seen that as the machine is drawn forward motion will be imparted from the ground wheels to the master gear 54 and thence through the described train of gearing to the vertical shaft 63. Slidably mounted upon the said shaft 63 is a bevel pinion 66 which meshes with the bevel gear 32 on the front end of the chopper shaft so that when the shaft 63 is rotated the chopper shaft will, also, be rotated and the chopper operated. The bevel pinion 66 is held upon the shaft 63 by means of a key fitting in a groove indicated at 67 so that the pinion may slide vertically upon the shaft. The upper portion of the shaft is reduced as shown clearly in Fig. 2 and its upper extremity is mounted in and supported by a bracket 68 secured to and projecting forwardly from the upper cross bar 8 of the main frame as shown. A bracket 69 is secured to the front cross bar of the horizontal frame 20 and passes under the pinion 66 and fits around the shaft 63 so that when the frame 20 is moved vertically the said pinion will also be caused to slide vertically upon the shaft 63 and the chopper may thus be operated at various depths. Should the frame be adjusted to such a height that the pinion 66 will be around the reduced portion of the shaft 63 the rotation of the shaft will not be imparted to the pinion inasmuch as the key on the said pinion will then be free of the groove or keyway in the shaft and the machine may then be drawn from field to field without causing the chopper to operate.

Secured upon the front cross bar of the frame 20 and arranged at the inner side of the same are brackets 70 in which is fitted a shaft or rod 71. Cultivator beams 72 have their front ends hung upon this rod or shaft 71 and the brackets 70 are constructed to fit around the front ends of said beams and thereby prevent movement of the same along the rod or shaft. The beams 72 extend rearwardly of the frame 20 and upon their rear extremities are mounted cultivator disks 73 as shown. These disks are arranged to run along the ground in advance of the chopper blade and normally cut away the loose dirt and weeds so that the resistance offered to the passage of the chopper blade 40 will be minimized. The disks may be reversed by interchanging them so that they will throw loose dirt up around the stems of the plants left standing and the apparatus thus utilized as a cultivator as well as a chopper. It will, of course, be understood that the cultivation may be performed at the same time as the chopping or prior or subsequent thereto as may be deemed most desirable. Upon the frame 20, in rear of the side members 2 of the main frame, is an arch 74 through the top of which extend presser bars or rods 75 having their lower ends pivoted to the cultivator beam 32 in advance of the axles of the disks 73, as shown clearly in Fig. 2. Stop pins 76 are fitted in these presser bars or rods above the arch 74 so as to prevent the rods dropping through the arch and rendering the device inoperative and springs 77 are coiled around the said rods or bars between the arch 74 and stop pins 78 so that pressure will be exerted upon the bars to hold the cultivator disks to their work. The tension of these springs may be obviously manipulated by fitting the stop pins 78 at points more or less distant from the top of the arch.

It is thought the operation and advantages of my machine will be readily understood from the foregoing description taken in connection with the accompanying drawings. Although I have intended the device more particularly for use in connection with shifting-seat cultivators it may be readily attached to any cultivator frame. The construction of the main frame and the brackets and clips by which it is secured to the front arch of the cultivator permit it to be attached to any width of frame and, also, be so positioned that the draft will be efficiently applied, while the telescopic construction of the shaft 47 permits the apparatus to be readily accommodated to the position of the ground wheels relative to the main frame of the cultivator or the front arch of the same. The ordinary cultivator shovels may remain in position upon the cultivator frame and will thus serve to turn the soil over to the plants after the hoe or chopper blade has cut through the row. The chopper will be positively driven and may be readily adjusted to operate at the desired depth below the surface. The entire apparatus may be quickly raised to an inoperative position when the machine is to be moved from field to field or into a storehouse.

Having thus described the invention, what is claimed as new, is:—

1. The combination of a frame having lateral projections on its sides, brackets adjustably secured to and extending between said projections, and means for clamping said brackets to a vehicle, said means being adjustable longitudinally of the main frame.

2. The combination of a frame having lateral projections on its sides, said projections being provided with longitudinal slots, brackets fitted between said projections, securing devices inserted through said brackets and said slots, and clamping plates fastened to the said brackets and adapted to secure the same to a carrier.

3. The combination of a frame having lateral projections on its sides, brackets secured to and between said projections and provided with longitudinal slots, clamping plates adapted to fit around a carrier and against the said brackets, and fastening devices inserted through said clamping plates and the slots of the said brackets.

4. The combination of a frame comprising side members having forwardly and rearwardly extending projections at their upper ends, cross bars secured to and extending between said projections, lateral brackets at the lower ends of said members, and a cross bar secured to and extending between said brackets.

5. The combination of a main frame having front and rear vertically disposed guides on its sides, a chopper-carrying frame having side members slidably fitted in said guides, racks formed on the forward guides, segmental gears mounted on the side members of the chopper-carrying frame and meshing with said racks, and means for oscillating said segmental gears.

6. The combination of a main frame, a vertically movable frame mounted on the main frame, a chopper shaft carried by the vertically movable frame, a vertically disposed shaft on the main frame, said shaft having a reduced upper portion and having a key-way in its lower portion terminating at said reduced upper portion, means for rotating the said vertical shaft, and gearing connecting the said shaft with the chopper shaft, said gearing comprising a pinion carried by the vertically movable frame and having a key engaging the key-way in the vertical shaft.

7. The combination of a main frame, a vertically movable frame mounted therein, a transverse shaft supported upon the front end of the main frame, means at one side of the main frame for operating said shaft, a vertically disposed shaft supported on the front end of the main frame, directly over the transverse shaft, gearing connecting said vertical shaft with the transverse shaft, a chopper shaft on the vertically movable frame, a gear wheel on said chopper shaft, a pinion slidably fitted upon the vertical shaft and meshing with the said gear wheel, and a bracket carried by the vertically movable frame and supporting said pinion.

8. The combination of a bracket having a lateral hub, a bearing on said bracket and a securing arm projecting at an angle to the said bearing, a gear fitted loosely upon the said hub, and a retaining device secured to the hub and fitting against the gear.

9. The combination of a supporting frame, a chopper shaft mounted thereon, means for rotating said shaft, a crank disk carried by said shaft, an oscillatory arm mounted on the frame, an eccentric secured to the crank disk about said shaft, an eccentric rod connecting said eccentric with the oscillatory arm, a chopper having a stem eccentrically fulcrumed upon said crank disk, and a connection between said stem and the oscillatory arm.

In testimony whereof I affix my signature in presence of two witnesses.

MARTIN A. JONES. [L. S.]

Witnesses:
A. C. AINSLEE,
T. C. VOHRENKAMP.

Copies of this patent may be obtained for five cents each, by addressing the "Commissioner of Patents Washington, D. C."